(12) United States Patent
Girolamo

(10) Patent No.: US 11,247,301 B2
(45) Date of Patent: Feb. 15, 2022

(54) METHOD OF REPAIRING A DAMAGED SPAR CAP OF A WIND TURBINE BLADE OF A WIND TURBINE

(71) Applicant: Siemens Gamesa Renewable Energy A/S, Brande (DK)

(72) Inventor: Donato Girolamo, Voorhout (NL)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 16/825,193

(22) Filed: Mar. 20, 2020

(65) Prior Publication Data

US 2020/0298351 A1 Sep. 24, 2020

(30) Foreign Application Priority Data

Mar. 21, 2019 (EP) .................................... 19164332

(51) Int. Cl.
 *B23P 6/00* (2006.01)
 *F03D 80/50* (2016.01)
 *B29L 31/08* (2006.01)

(52) U.S. Cl.
 CPC ......... *B23P 6/007* (2013.01); *B29L 2031/085* (2013.01); *F03D 80/50* (2016.05); *Y10T 29/49318* (2015.01); *Y10T 29/49732* (2015.01)

(58) Field of Classification Search
 CPC .... B23P 6/002; B23P 6/005; Y10T 29/49732; Y10T 29/49734; Y10T 29/49746; Y10T 29/49318; B29L 2031/085; F03D 80/50
 See application file for complete search history.

(56) References Cited

U.S. PATENT DOCUMENTS

| 4,352,142 | A | * | 9/1982 | Olson | ....................... H05F 3/00 |
| | | | | | 361/117 |
| 4,517,038 | A | * | 5/1985 | Miller | ..................... B29C 73/10 |
| | | | | | 156/94 |
| 4,554,036 | A | * | 11/1985 | Newsom | ................. B29C 73/30 |
| | | | | | 156/285 |
| 4,668,317 | A | * | 5/1987 | Snyder | ...................... B23C 3/00 |
| | | | | | 156/258 |
| 4,808,253 | A | * | 2/1989 | Mimbs | .................... B29C 35/02 |
| | | | | | 156/289 |

(Continued)

FOREIGN PATENT DOCUMENTS

| EP | 2273102 A2 | 1/2011 |
| EP | 3501809 A1 | 6/2019 |

(Continued)

OTHER PUBLICATIONS

Extended European Search Report for related European Patent Application No. 19164332.9, dated Sep. 16, 2019. 6 pages.

*Primary Examiner* — Jason L Vaughan
(74) *Attorney, Agent, or Firm* — Schmeiser, Olsen & Watts, LLP

(57) ABSTRACT

A method of repairing a damaged spar cap of a wind turbine blade of a wind turbine, the damaged spar cap including carbon fiber-reinforced plastic and the method having the steps of: removing a damaged carbon fiber-reinforced plastic part from the damaged spar cap to obtain a corresponding recess in the damaged spar cap, applying an adhesive to the recess, and fitting at least one patch including carbon fiber-reinforced plastic into the recess, is provided.

15 Claims, 8 Drawing Sheets

(56) References Cited

U.S. PATENT DOCUMENTS

| | | | | |
|---|---|---|---|---|
| 4,824,500 | A * | 4/1989 | White | B29C 73/04 156/153 |
| 4,961,799 | A * | 10/1990 | Cologna | B29C 73/14 156/250 |
| 5,958,166 | A * | 9/1999 | Walters | B29C 73/32 156/94 |
| 6,174,392 | B1 * | 1/2001 | Reis | B29C 73/06 156/58 |
| 6,206,067 | B1 * | 3/2001 | Kociemba | B29C 43/3642 156/285 |
| 6,270,603 | B1 * | 8/2001 | Westerman | B29C 35/02 156/94 |
| 6,656,299 | B1 * | 12/2003 | Grosskrueger | B29C 73/02 156/293 |
| 7,198,471 | B2 * | 4/2007 | Gunneskov | F03D 1/065 416/229 R |
| 7,628,879 | B2 * | 12/2009 | Ackerman | C09J 7/21 156/98 |
| 7,927,077 | B2 * | 4/2011 | Olson | F03D 1/0675 416/229 R |
| 8,052,910 | B2 * | 11/2011 | Aijima | B29C 70/54 264/258 |
| 8,333,864 | B2 * | 12/2012 | Brennan | B29C 70/44 156/285 |
| 8,420,002 | B2 * | 4/2013 | Sekido | B29C 70/68 264/511 |
| 8,475,615 | B2 * | 7/2013 | Deleris | B29C 73/26 156/98 |
| 8,540,909 | B2 * | 9/2013 | Dan-Jumbo | B32B 19/04 264/36.1 |
| 8,545,650 | B2 * | 10/2013 | Evens | B29C 73/12 156/64 |
| 8,623,160 | B2 * | 1/2014 | Benthien | B29C 73/10 156/94 |
| 8,747,592 | B2 * | 6/2014 | Stenbaek | B29C 73/10 156/94 |
| 9,599,094 | B2 * | 3/2017 | Dahl | F03D 13/10 |
| 9,636,867 | B2 * | 5/2017 | MacAdams | B29C 66/30322 |
| 10,113,531 | B2 * | 10/2018 | Caruso | F03D 1/0675 |
| 2006/0277753 | A1 * | 12/2006 | Ntsama-Etoundi | F01D 5/005 29/889.1 |
| 2010/0047541 | A1 * | 2/2010 | Care | B29C 73/10 428/212 |
| 2010/0140217 | A1 * | 6/2010 | Weisser | B29C 73/26 216/33 |
| 2011/0209347 | A1 | 9/2011 | Deak et al. | |
| 2020/0062887 | A1 * | 2/2020 | Wegener | C08G 18/4804 |

FOREIGN PATENT DOCUMENTS

| | | |
|---|---|---|
| EP | 3501810 A1 | 6/2019 |
| EP | 3511560 A1 | 7/2019 |
| WO | 2009080038 A1 | 7/2009 |
| WO | 2016150445 A1 | 9/2016 |

* cited by examiner

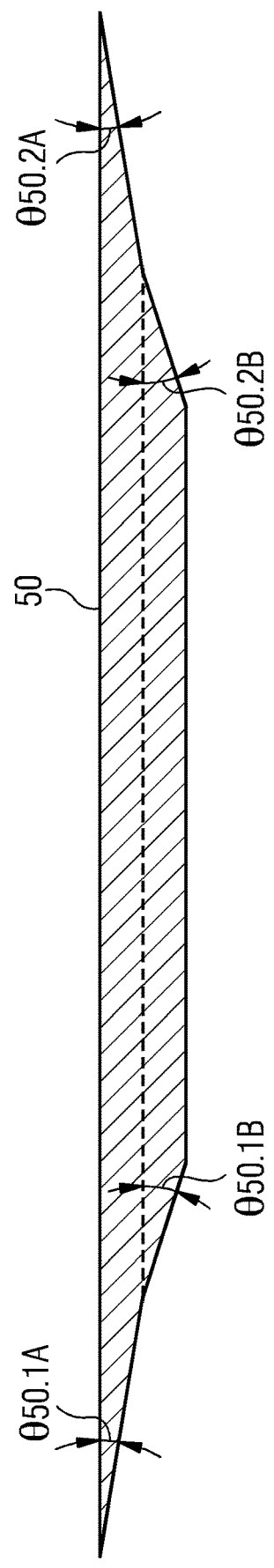

METHOD OF REPAIRING A DAMAGED SPAR CAP OF A WIND TURBINE BLADE OF A WIND TURBINE

CROSS-REFERENCE TO RELATED APPLICATIONS

This application claims priority to European Patent Application No. EP 19164332.9, having a filing date of Mar. 21, 2019, the entire contents of which are hereby incorporated by reference.

FIELD OF TECHNOLOGY

The following relates to a method of repairing a damaged spar cap of a wind turbine blade of a wind turbine, the damaged spar cap comprising carbon fiber-reinforced plastic.

BACKGROUND

Wind turbine blades must be able to efficiently convert wind into spinning movement of the wind turbine blades, so that energy of the wind can be converted into rotary mechanical movement of a rotor to which the wind turbine blades are attached. It is preferable, to use materials having a high specific modulus (elastic modulus per mass density of a material), also known as stiffness to weight ratio, in wind turbine blades. This is particularly important in the spar caps of wind turbine blades because the spar caps are subjected to high bending loads (also referred to as flapwise loads) occurring in the operation of the wind turbine and transfer these to the wind turbine hub and ultimately to the foundations of the wind turbine.

When parts of a spar cap made from carbon fiber-reinforced plastic are damaged due to manufacturing defects, transportation damages or even due to fatigue, for example, it is very challenging to repair the spar caps mainly due to the following two requirements. On the one hand, what must be taken into account is that carbon fiber-reinforced plastic is an electrically conductive material and must be integrated within a lightning protection system of the wind turbine for a case where the wind turbine blade intercepts a lightning strike. The lightning protection system may comprise electrical terminals embedded in the spar cap and a down-conductor, for example. In the case of a lightning strike interception by the spar cap, the carbon fiber-reinforced plastic leads the electrical current from the lightning strike to the ground. In a pristine state of the spar cap, the carbon fiber-reinforced plastic is a good electrical conductor in its fiber direction, due to the continuity of the carbon fibers. Repair methodologies require interrupting the aforementioned continuity and electrical conductivity and determine a discontinuity for the electrical path along the spar cap. In case of a lightning strike, the current lead by the spar cap sparks across such discontinuity. Therefore, if a repaired part of the spar cap is not properly integrated in the lightning protection system, the carbon fiber-reinforced plastic can fail due to direct lightning strike and/or flashovers from the main down-conductor while leading the current to the ground. On the other hand, the high stiffness and structural integrity of the spar caps must be maintained after a repair is performed.

Generally, methods for repairing structures made from carbon fiber-reinforced plastic in the state of the art are known. For example, U.S. Pat. No. 7,628,879 B2 relates to such a method. However, this method relates to wing assemblies of aircrafts and is thus not applicable to repairing a wind turbine blade for a wind turbine.

Therefore, there is a need for a simple and cost-efficient method of repairing a spar cap of a wind turbine blade of a wind turbine, the spar cap comprising carbon fiber-reinforced plastic by which the electrical conductivity, high stiffness and structural integrity of the spar cap are maintained.

This apect of the invention is solved by a method of repairing a spar cap comprising carbon fiber-reinforced plastic.

SUMMARY

According to the embodiment of the present invention, the problem is solved by a method of repairing a damaged spar cap of a wind turbine blade of a wind turbine, the damaged spar cap comprising carbon fiber-reinforced plastic and the method having the steps of: (a) removing damaged carbon fiber-reinforced plastic from the damaged spar cap to obtain a corresponding recess in the damaged spar cap, (b) applying an adhesive to the recess, (c) fitting at least one patch comprising carbon fiber-reinforced plastic into the recess, and (d) joining the at least one patch with the spar cap to obtain a repaired spar cap.

The method of the embodiment of the present invention is particularly applied to a spar cap of a wind turbine blade of a wind turbine. In particular, the spar cap, and more particularly the carbon fiber-reinforced plastic of the spar cap, is connected to a down-conductor of a wind turbine. The carbon fiber-reinforced plastic of the spar cap may be connected to electrical terminals and the electrical terminals may be connected to the down-conductor. Carbon conductive mats may be arranged to connect the carbon fiber-reinforced plastic of the spar cap to the electrical terminals.

In particular, the carbon fiber-reinforced plastic is a unidirectional carbon fiber-reinforced plastic. This means that all or at least 95% of the fibers are directed in only one direction. Moreover, in particular, the carbon fiber-reinforced plastic is a continuous carbon-fiber reinforced plastic. Moreover, the carbon fiber-reinforced plastic, especially the carbon fiber-reinforced plastic of the patch, may comprise pre-impregnated fibers and in particular be a prepreg. For example, a thermoset polymer matrix material, such as epoxy, or a thermoplastic resin may already be present in the pre-impregnated carbon fiber-reinforced plastic.

Prior to removing the damaged carbon-fiber reinforced plastic part, the damaged part or an area of the damaged part of the spar cap may be identified by means of a non-destructive technology such as ultrasonic scanning, for example. The damaged part or area may further be cleaned and/or paint attached to the spar cap may be removed in the damaged area prior to removing the damaged carbon-fiber reinforced plastic. Also, the repaired spar cap may be non-destructively tested to determine a quality of the repair.

In an embodiment of the present invention, the recess is tapered in at least one direction with a tapering angle $\Theta_{43}$ and/or at least one of the at least one patches is chamfered in at least one direction with a chamfering angle $\Theta_{50}$. The tapering angle $\Theta_{43}$ is in the range of 0.2° to 10°, in the range of 0.4° to 7° and more exemplary embodiment in the range of 0.6° to 5°. The chamfering angle $\Theta_{50}$ is in the range of 0.2° to 10°, in the range of 0.4° to 7° and more exemplary embodiment in the range of 0.6° to 5°. The tapering angle $\Theta_{43}$ and/or chamfering angle $\Theta_{50}$ ensures a smooth transition of the stiffness from the spar cap to the patch. Generally, a small angle is preferred since the load is transferred via shear rather than peel and provided adhesives are much tougher and stronger in shear mode. Moreover, the effective adhesive surface is increased and thereby the stability of the joint between the at least one patch and the spar cap is increased.

Moreover, it is preferred that at least one of the at least one direction of the tapering and/or at least one of the at least one direction of the chamfering is a fiber direction F of the carbon fiber-reinforced plastic. The fiber direction F is a unidirectional direction of unidirectional carbon fiber-reinforced plastic. Thereby, the transition of the stiffness from the spar cap to the patch is further improved.

Furthermore, it is preferred that the tapering angle $\Theta_{43}$ corresponds to the chamfering angle $\Theta_{50}$. This means, that the tapering angle $\Theta_{43}$ is equal or substantially equal to the chamfering angle $\Theta_{50}$, meaning that the tapering angle $\Theta_{43}$ may be a value of 90% to 110% of the chamfering angle $\Theta_{50}$. Thereby, the fitting of the at least one patch into the recess is facilitated and the thickness of a connection means, such as an adhesive, is controlled. In particular, the patch is fitted form-fitting into the corresponding recess.

It is an option that the at least one patch comprises, in particular along a single chamfer of the at least one patch, at least two different chamfering angles $\Theta_{50.1}$, $\Theta_{50.2}$. In particular, the chamfering angles $\Theta_{50.1}$, $\Theta_{50.2}$ may deviate from one another by at least 0.1°, by at least 0.3° and more exemplary embodiment by at least 0.5° and up to a maximum of 5°. One of the chamfering angles $\Theta_{50.1}$, in particular the chamfering angle $\Theta_{50.1}$ provided closer to a long end of the patch, is smaller than the other one of the chamfering angles $\Theta_{50.2}$, in particular the chamfering angle $\Theta_{50.2}$ provided closer to a middle portion of the patch. The chamfering angle $\Theta_{50.1}$ provided closer to the long end of the patch may be in the range of 0.5° to 3°, for example. The chamfering angle $\Theta_{50.2}$ provided closer to the middle portion of the patch may be in the range of 1° to 5° for example. Thereby, two adhesive surfaces of different incline are provided, which further increases the stability of the joint between the at least one patch and the spar cap.

In an embodiment of the present invention, the adhesive is applied continuously on at least 80% of a surface of the recess and in particular at least 90% of the surface of the recess. More particularly, the adhesive may be applied to the entire surface of the recess. In other words, the adhesive extends continuously along the surface of the recess. Thereby, the adhesive extends continuously along a full repair section, in which the carbon fibers of the spar cap have been interrupted after removal of the damaged part and connected to the adhesive.

In embodiment of the present invention, the adhesive is an electrically conductive adhesive film. Thereby, a lightning current from a lightning strike can be transferred across the patch. In particular, the conductive adhesive film may comprise an adhesive layer and a conductive material layer. The conductive material layer may comprise carbon fibers or metal scrims, for example.

In a further embodiment of the present invention, the at least one patch is provided with a peel-ply on a top surface and/or a bottom surface of the patch, whereby the peel-ply is removed prior to fitting the at least one patch into the recess. The peel-ply may be a sacrificial nylon, polyester or non-porous Teflon ply. Thereby, the surface of the patch is protected from contamination and activation of the surface upon removal of the peel-ply for enhancing adhesive bonding is achieved.

In another embodiment of the present invention, the carbon fiber-reinforced plastic of the spar cap and/or the carbon fiber-reinforced plastic of the patch are provided as pultruded carbon elements. This are in particular pre-cured carbon fibers, where the matrix is already hardened via, for instance, a pultrusion process. By means of using pultruded carbon elements, the risk of introducing wrinkles during repair, which might lead to further structural damage of the spar cap during repair, is eliminated. The pultruded carbon elements may have a width in the range of 20 mm to 500 mm, in the range of 50 mm to 300 mm. The pultruded carbon elements may have a thickness in the range of 0.1 mm to 10 mm, in the range of 2 mm to 5 mm. The pultruded carbon elements of the spar cap and of the patches have an equal or substantially equal thickness.

It is an option that the spar cap and/or the at least one patch are provided with an array of at least two pultruded carbon elements arranged parallel to each other in a fiber direction F of the carbon fiber-reinforced plastic. Since the relatively stiff carbon fiber-reinforced plastic is arranged farther away from a neutral axis of the wind turbine blade, whereby a sectional inertia of the wind turbine blade is increased, the stiffness distribution along the spar cap is improved.

Moreover, it is an option that the spar cap and/or the at least one patch are provided with a stack of at least two pultruded carbon elements arranged stacked on top of each other. Thereby, the stiffness of the spar cap can be improved.

In yet another optional embodiment of the present invention, at least two patches are being fitted into the recess, whereby adhesive is applied on top of at least one of the at least two patches. In particular, the adhesive may be one that can be applied to the recess as previously described. The at least two patches may have equal or substantially equal chamfering angles $\Theta_{50}$. Thereby, the stability of the joint between the patches and the spar cap is further increased.

In an embodiment of the present invention, damaged carbon fiber-reinforced plastic is removed from the spar cap by means of abrasion and/or sanding. A tool for abrasion and/or sanding may be led by hand or by a CNC machine. Thereby, the damaged carbon fiber-reinforced plastic is removed in a precise and cost-efficient manner.

In a further embodiment of the present invention, the at least one patch is joined with the spar cap by means of vacuum bagging using a vacuum bagging assembly. In this way, the joint between the patches and the spar cap is established uniformly across the damaged area and thereby becomes very stable. The vacuum bagging assembly may comprise: a vacuum source, a vacuum bag, a vacuum port, a breather material, a non-perforated release foil, a bleeder material and a perforated release foil. In particular, the vacuum bag is an airtight flexible sheet placed over a lay-up comprising the breather material, the non-perforated release foil, the bleeder material and the perforated release foil. The lay-up may be sealed by means of sealants along its edges. The vacuum bag may be fitted with the vacuum ports, which may be connected to the vacuum source. During the cure, the vacuum bag is evacuated and the lay-up is compacted under atmospheric or autoclave pressure. Vacuum may be applied to the vacuum bag during the entire cure cycle. The lay-up comprises the breather material, the non-perforated release foil, the bleeder material and the perforated release foil are arranged in the listed order with the perforated release foil being arranged in contact with the top surface of the patch. In particular, the breather material is a loosely woven or nonwoven material that acts as a continuous vacuum path over a part but does not come in contact with adhesive from the patch, for example. Particularly, the bleeder material is a nonstructural layer of material used to allow an escape of excess gas and resin during cure. The bleeder material can be removed after the curing process is completed and any excess resin taken with it. The perforated release film may be a solid release film that has been perforated with a hole pattern, which may be uniform. The effect of the perforated release film is to restrict the amount of resin bleed that is able to pass through the perforated release film. The non-perforated release foil may be used in the vacuum bagging process that can be in direct contact with a part without bonding. The vacuum bagging assembly can easily be removed after joining the patch with the spar cap.

Furthermore, it is preferred that the at least one patch is joined with the spar cap by applying heat to the at least one patch, in particular by means of a heating blanket. The application of heat may be provided additionally to the vacuum bagging. In particular, the heating blanket and/or a thermocouple may be enclosed by the vacuum bag of the vacuum bagging assembly. Thereby, the process of vacuum bagging may be controlled and certified.

In yet another embodiment, at least one doubler plate is being arranged on top of the at least one patch and the spar cap and the at least one doubler plate is being joined with the at least one patch and the spar cap. The doubler plate may comprise or be made from carbon fiber-reinforced plastic. In particular, the doubler plate may be made from pultruded carbon elements. The doubler plate may be designed like the patch as previously described. Adhesive as previously described may be applied between the doubler plate and the patch and the spar cap. The doubler plate may be arranged overlapping a boundary line between the patch and the spar cap. The doubler pate may be provided with a tapering having a tapering angle $\Theta_{70}$ in the range of 0.2° to 10°, in the range of 0.4° to 7° and more exemplary embodiment in the range of 0.6° to 5°. The length of the doubler plate may be in the range of 50 mm to 2.000 mm and in the range of 200 mm to 1.000 mm. The doubler plate provides a redundant second load path across the repair and thereby provides a particularly stable joint between the patch and the spar cap at the cost of minimal weight addition to the spar cap.

BRIEF DESCRIPTION

Some of the embodiments will be described in detail, with reference to the following figures, wherein like designations denote like members, wherein:

FIG. 12 depicts a side view on a patch according to a third embodiment.

Same aspect in FIGS. 1 to 12 are denominated with the same reference number. If there is more than one aspect of the same kind in one of the figures, the aspects are numbered in ascending order with the ascending number of the aspect being separated from its reference number by a dot.

DETAILED DESCRIPTION

Figure 1:
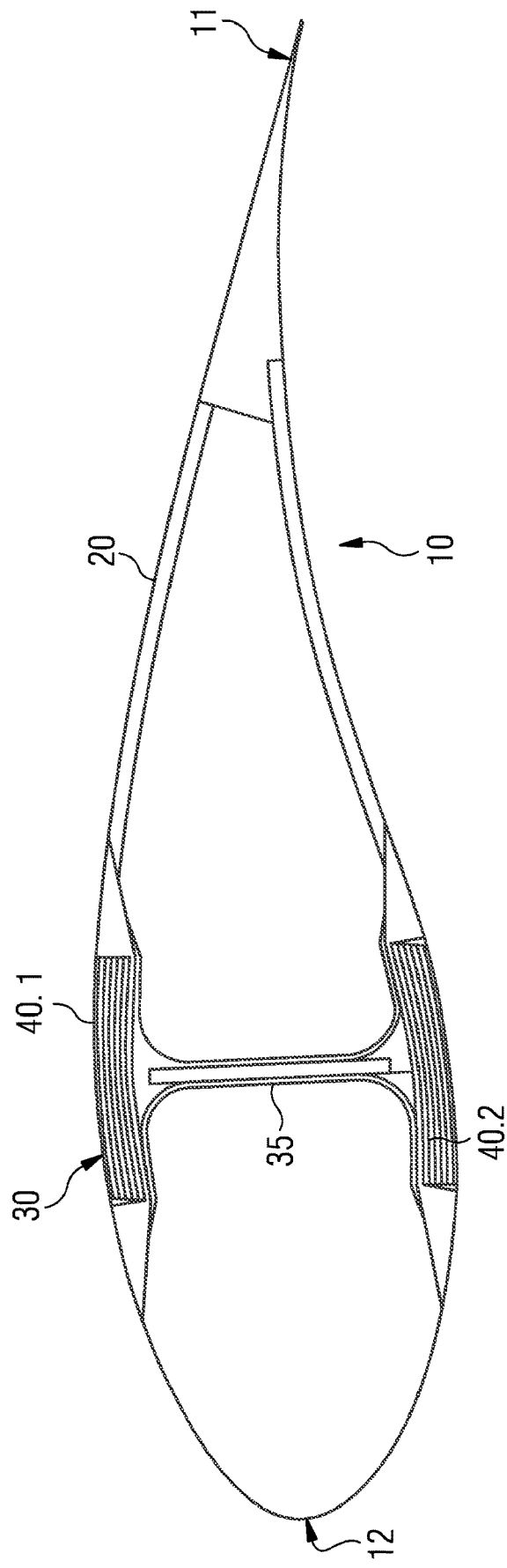
FIG. 1 depicts a sectional view along a transversal plane of a wind turbine blade.

FIG. 1 is a sectional view along a transversal plane of a first embodiment of a wind turbine blade 10 according to the embodiment of the present invention. The wind turbine blade 10 has a trailing edge 11 and a leading edge 12. The wind turbine blade 10 comprises a shell 20 and a spar 30. The spar 30 comprises two spar caps 40.1, 40.2, which face each other and are connected to one another by means of a spar web 35.

Figure 2:
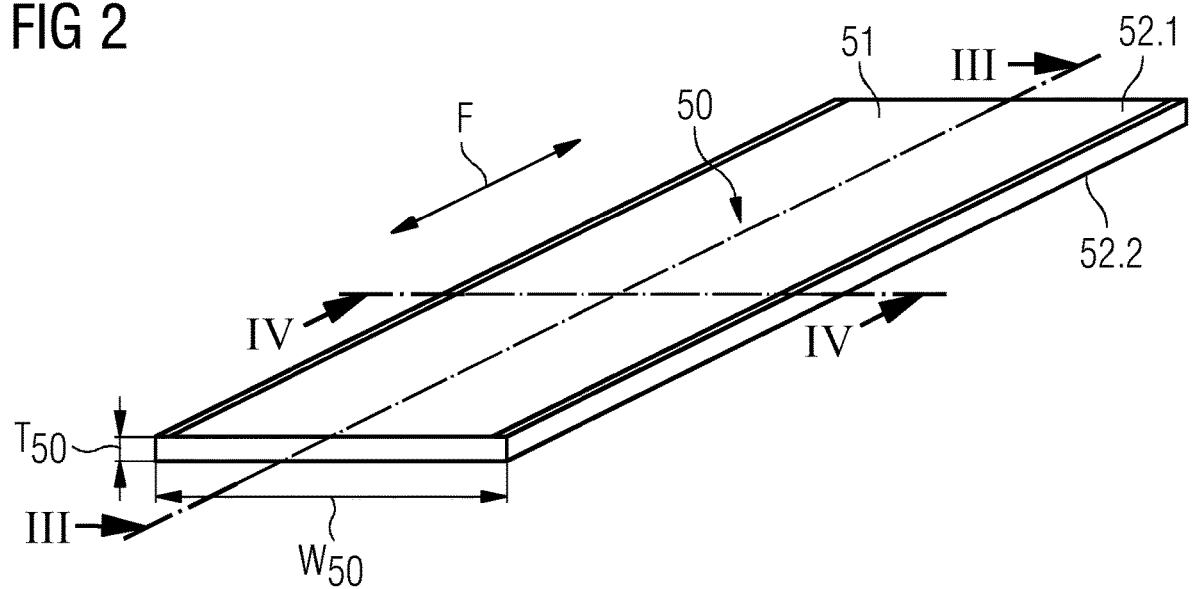
FIG. 2 depicts a perspective view of a patch according to a first embodiment.

FIG. 2 is a perspective view of a patch 50 according to a first embodiment, which may be used in the method according to the embodiment of the present invention. The patch 50 is a pultruded carbon element 51 with unidirectional fibers arranged in the direction of the arrow F. The patch 50 comprises a peel-ply 52.1 arranged on a top surface of the patch 50 and a peel-ply 52.2 arranged on a bottom surface of the patch 50. The patch 50 has a thickness $T_{50}$ in the range of 1 mm to 5 mm and a width $W_{50}$ in the range of 50 mm to 300 mm.

Figure 3:
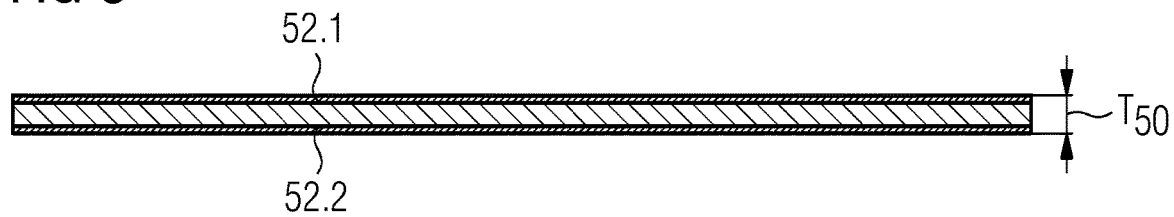
FIG. 3 depicts a sectional long side view of the patch from FIG. 2.
Figure 4:
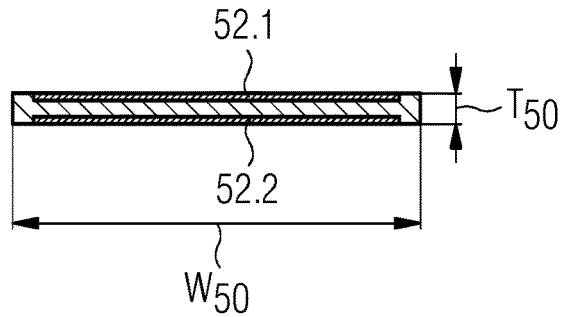
FIG. 4 depicts a sectional short side view of the patch from FIG. 2.

FIG. 3 is a sectional long side view of the patch 50 from FIG. 2 along cutting line III-III. FIG. 4 is a sectional short side view of the patch 50 from FIG. 2 along cutting line IV-IV.

Figure 5:
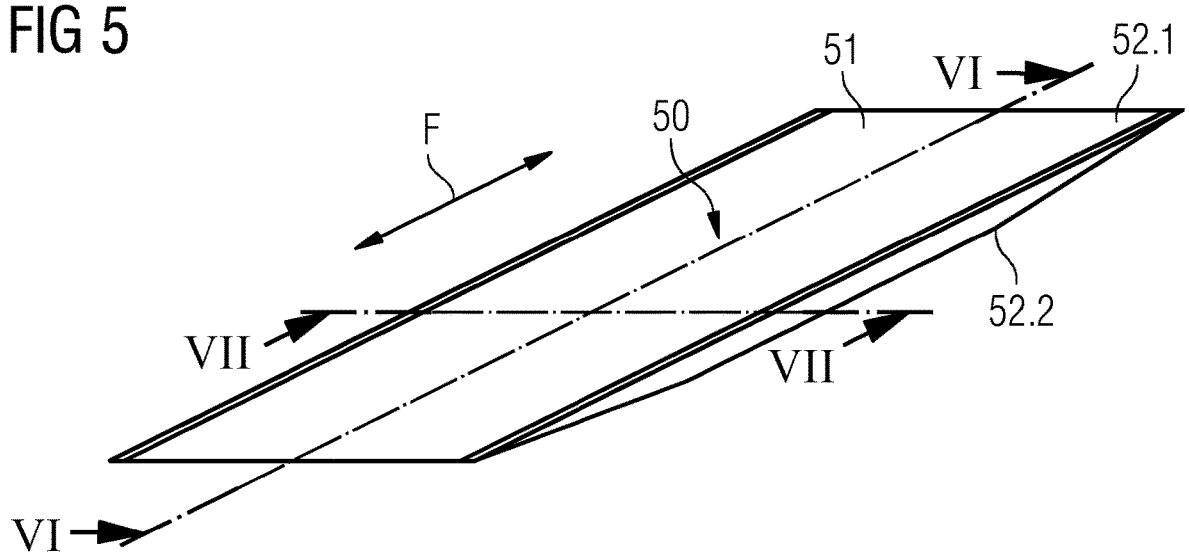
FIG. 5 depicts a perspective view of a patch according to a second embodiment.

FIG. 5 is a perspective view of a patch 50 according to a second embodiment, which may be used in the method according to the embodiment of the present invention. The patch 50 is a pultruded carbon element 51 with unidirectional fibers in the direction of the arrow F. The patch 50 comprises a peel-ply 52.1 arranged on a top surface of the patch 50 and a peel-ply 52.2 arranged on a bottom surface of the patch 50. The patch 50 has a thickness $T_{50}$ in the range of 1 mm to 5 mm and a width $W_{50}$ in the range of 50 mm to 300 mm. The patch 50 is chamfered on the bottom surface of the patch 50 in the fiber direction F. The chamfering is provided at the long sides of the patch 50 with a middle portion of the patch 50 not being chamfered, i.e. arranged parallel to the top surface.

Figure 6:
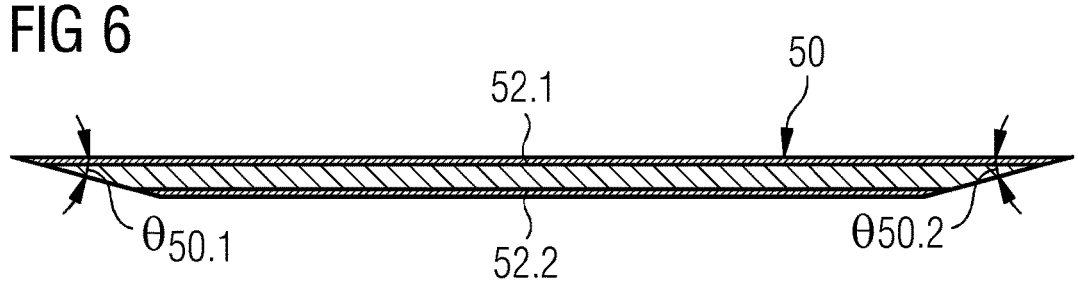
FIG. 6 depicts a sectional long side view of the patch from FIG. 5.

FIG. 6 is a sectional long side view of the patch 50 from FIG. 5 along cutting line VI-VI. Here, the chamfering angles $\Theta_{50.1}$, $\Theta_{50.2}$ of the chamfers are marked. Both chamfering angles $\Theta_{50}$, $\Theta_{50.2}$ are in the range of 1° to 5° and are equal to each other in this embodiment.

Figure 7:
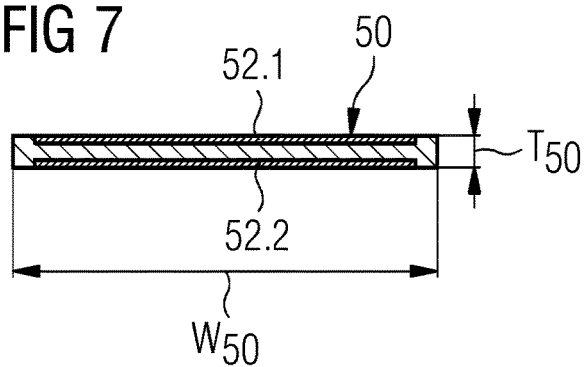
FIG. 7 depicts a sectional short side view of the patch from FIG. 5.

FIG. 7 is a sectional short side view of the patch 50 from FIG. 5 along cutting line VII-VII. Because the middle portion of the patch 50 along cutting line VII-VII is not chamfered but arranged parallel to the top surface of the patch 50, FIG. 7 is equal to FIG. 4.

Figure 8:
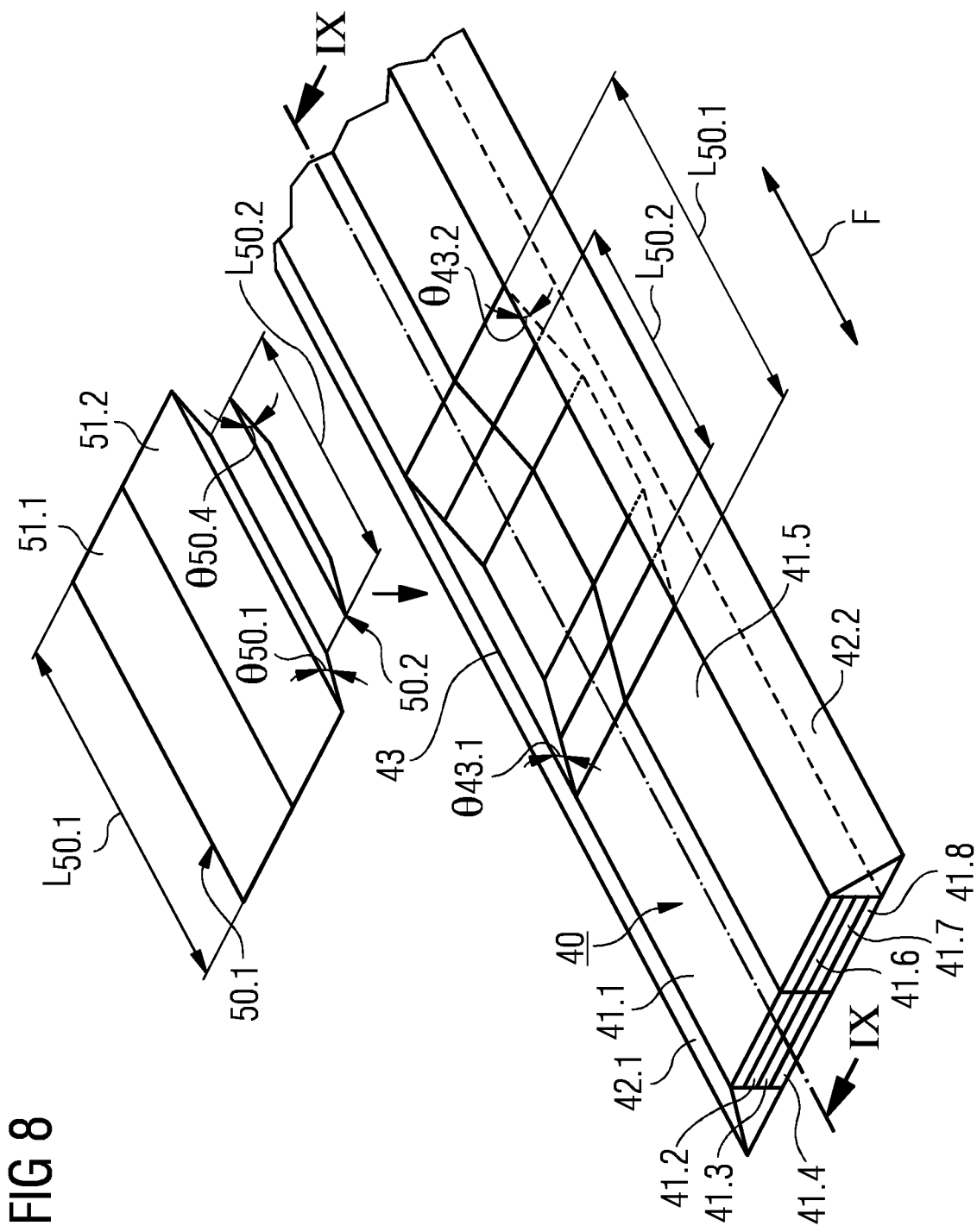
FIG. 8 depicts a perspective view of a step of the method according to an embodiment.

FIG. 8 is a perspective view on a step of the method according to the embodiment of the present invention. In this step, two patches 50.1, 50.2 are fitted into a recess 43 of the spar cap 40, which is one of the spar caps 40.1, 40.2 of the wind turbine blade 10 from FIG. 1. The spar cap 40 comprises an array of a first stack of pultruded carbon elements 41.1, 41.2, 41.3, 41.4 and a second stack of pultruded carbon elements 41.5, 41.6, 41.7, 41.8, the first and second stack being arranged parallel to each other in the fiber direction F of the pultruded carbon elements 41.1 . . . 41.8. Further, the patches 50.1, 50.2 comprise an array of pultruded carbon elements 51.1, 51.2, with the pultruded carbon elements 51 of the patch 50.2 not being visible in this perspective because they are covered by the patch 50.1. Wedge elements 42.1 and 42.2 are arranged in a transverse direction adjacent to the pultruded carbon elements 41.1 . . . 41.8. The recess 43 within both stacks of the pultruded carbon elements 41.1 . . . 41.8 corresponds to fit the patches 50.1, 50.2. In particular, the recess 43 is tapered in the fiber direction F with tapering angles $\Theta_{43.1}$, $\Theta_{43.2}$, which are equal to each other in this embodiment. The tapering angles $\Theta_{43.1}$, $\Theta_{43.2}$ correspond to chamfering angles $\Theta_{50.1}$ . . . $\Theta_{50.4}$ of the patches 50.1, 50.2. The patches 50.1, 50.2 are fitted with their lengths $L_{50.1}$, $L_{50.2}$ measured in the fiber direction F into the recess 43.

Figure 9:
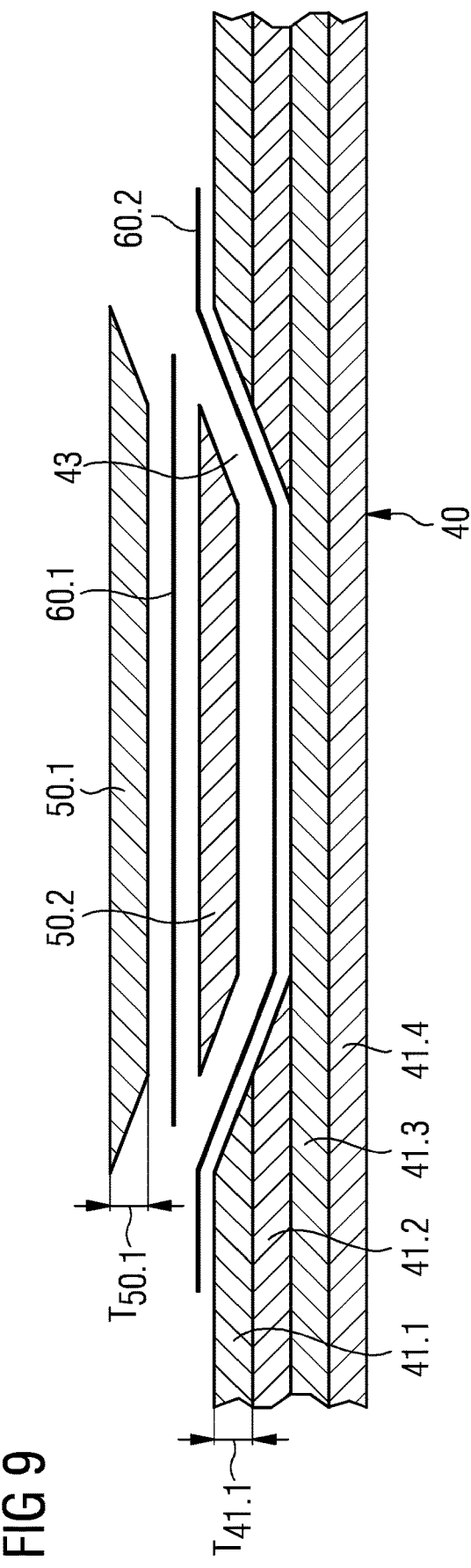
FIG. 9 depicts a side sectional view of the step of the method according to the embodiment from FIG. 8.

FIG. 9 is a side sectional view on the step of the method according to the embodiment of the present invention from FIG. 8 along cutting line IX-IX of the spar cap 40 and the patch 50. In this embodiment, portions of the first two pultruded carbon elements 41.1, 41.2 of the first array of the spar cap 40 have been removed to form the recess 43. Adhesive 60.1 has been applied between the patches 50.1, 50.2 and adhesive 60.2 has been applied between the patch 50.2 and the spar cap 40. The thickness $T_{50.1}$ of the patch 50.1 corresponds to the thickness $T_{41.1}$ of the pultruded carbon element 41.1. Further, the thickness of the patch 50.2 corresponds to the thickness of the pultruded carbon element 41.2.

Figure 10:
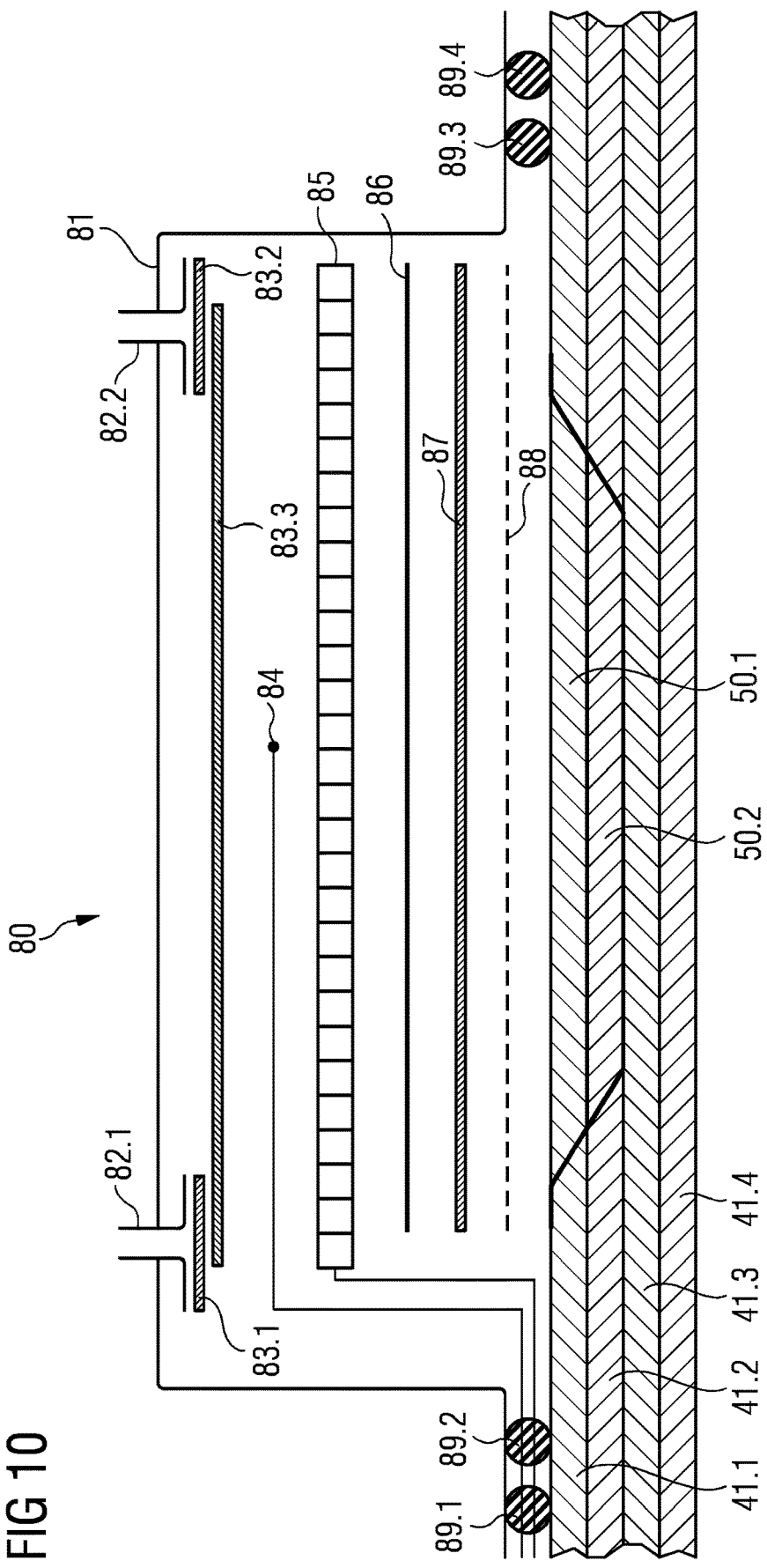
FIG. 10 depicts a side view on a further step of the method according to the embodiment following the step from FIG. 9.

FIG. 10 is a side view on a further step of the method according to the embodiment of the present invention following the step from FIG. 9. Here, the patches 50.1, 50.2 are joined with the spar cap 40 by means of vacuum bagging using a vacuum bagging assembly 80 arranged on top of the patches 50.1, 50.2 and the spar cap 40. The vacuum bagging assembly comprises a vacuum source (not shown), a vacuum bag 81, two vacuum ports 82.1, 82.2 fitted to the vacuum bag 81 and a lay-up consisting of a breather material 83.1, 83.2, 83.3, a non-perforated release foil 86, a bleeder material 87 and a perforated release foil 88. The lay-up is enclosed by the vacuum bag 81, which is sealed by means of sealants 89.1, 89.2, 89.3, 89.4 to the spar cap 40. A thermocouple 84 and a heating blanket 85 are arranged between the breather material 83.1, 83.2, 83.3 and the non-perforated release foil 86. Power and control lines of the thermocouple 84 and heating blanket 85 are led out of the vacuum bag 81. The thermocouple 84 and heating blanket 85 may be connected to a control unit (not shown) for temperature-adjusted control of the heating blanket 85.

In operation, the vacuum bag 81 is evacuated to compact the lay-up under atmospheric pressure. The breather material 83.1, 83.2, 83.3 acts as a continuous vacuum path but does not come in contact with adhesive from the precured patches 50.1, 50.2. The bleeder material 87 allows the escape of excess gas and resin during cure. The effect of the perforated release film 88 is that it restricts the amount of resin bleed that is able to pass through the perforated release film 88. The non-perforated release foil 86 is in direct contact with the heating blanket 85, so that it is not bonded. After operation, the vacuum bag assembly 80 can be removed and the repair has been performed, so that a repaired spar cap 40 is obtained.

Figure 11:
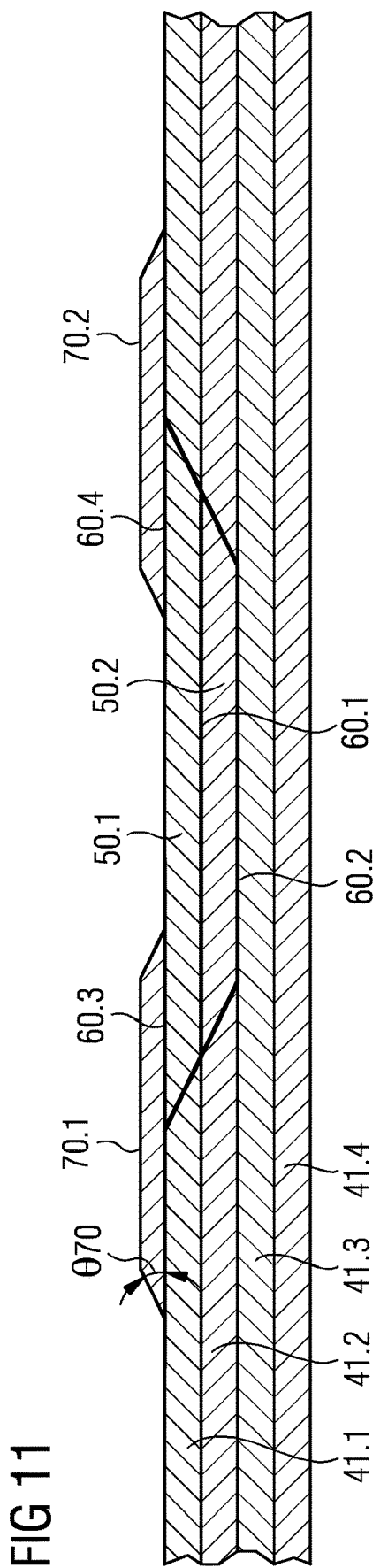
FIG. 11 depicts a side sectional view on yet another step of the method according to the embodiment following the step from FIG. 10.

FIG. 11 is a side sectional view on a further step of the method according to the embodiment of the present invention following the step from FIG. 10. Here, the patches 50.1, 50.2 have been joined with the spar cap 40 and a repaired spar cap 40 was obtained. Further, doubler plates 70.1, 70.2 made from pultruded carbon elements have additionally been arranged on top of the patch 50.1 and the spar cap 40, in particular on top of the pultruded carbon element 41.1 of the spar cap 40, to strengthen the joint of the patches 50.1, 50.2 with the spar cap 40. By means of adhesive 60.3, 60.4 the doubler plates 70.1, 70.2 are joined with the spar cap 40 and the patch 50.1. The doubler pates 70.1, 70.2 are provided with a tapering having a tapering angle $\Theta_{70}$.

FIG. 12 is a side view on a patch 50 according to a third embodiment. Here, first chamfers are provided having a first chamfering angle $\Theta_{50.1A}$, $\Theta_{50.2A}$ being equal to one another at the long sides of the patch 50. Second chamfers having second chamfering angles $\Theta_{50.1B}$, $\Theta_{50.2B}$ being greater than the first chamfering angles $\Theta_{50.1A}$, $\Theta_{50.2A}$ are provided adjacent to the first chamfers in a direction pointing towards a middle portion of the patch 50. The bottom surface of the middle portion of the patch 50 is parallel to the top surface of the patch 50.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of repairing a damaged spar cap of a wind turbine blade of a wind turbine, the damaged spar cap comprising carbon fiber-reinforced plastic, the method comprising:
    removing a damaged carbon fiber-reinforced plastic part from the damaged spar cap to obtain a corresponding recess in the damaged spar cap;
    applying an adhesive to the corresponding recess;
    fitting at least one patch comprising carbon fiber-reinforced plastic into the corresponding recess, wherein the carbon fiber-reinforced plastic of the at least one patch are pultruded carbon elements; and
    joining the at least one patch with the spar cap to obtain a repaired spar cap.

2. The method according to claim 1, wherein the corresponding recess is tapered in at least one direction with a tapering angle and at least one of the at least one patches is chamfered in at least one direction with a chamfering angle.

3. The method according to claim 2, wherein at least one of the at least one direction of the tapering and/or at least one of the at least one direction of the chamfering is a fiber direction of the carbon fiber-reinforced plastic.

4. The method according to claim 2, wherein the tapering angle corresponds to the chamfering angle.

5. The method according to claim 1, wherein the adhesive is applied continuously on at least 80% of a surface of the corresponding recess.

6. The method according to claim 1, wherein the adhesive is an electrically conductive adhesive film.

7. The method according to claim 1, wherein the at least one patch is provided with a peel-ply on a top surface and/or a bottom surface of the patch, whereby the peel-ply is removed prior to fitting the at least one patch into the corresponding recess.

8. The method according to claim 1, wherein the carbon fiber-reinforced plastic of the damaged spar cap are provided as pultruded carbon elements.

9. The method according to claim 8, wherein the damaged spar cap and/or the at least one patch are provided with an array of at least two pultruded carbon elements arranged parallel to each other in a fiber direction of the carbon fiber-reinforced plastic.

10. The method according to claim 8, wherein the damaged spar cap and/or the at least one patch are provided with a stack of at least two pultruded carbon elements arranged stacked on top of each other.

11. The method according to claim 1, wherein at least two patches are being fitted into the corresponding recess, whereby the adhesive is applied on top of at least one of the at least two patches.

12. The method according to claim 1, wherein the damaged carbon fiber-reinforced plastic is removed from the damaged spar cap by means of abrasion and/or sanding.

13. The method according to claim 1, wherein the at least one patch is joined with the damaged spar cap by means of vacuum bagging using a vacuum bagging assembly.

14. The method according to claim 1, wherein the at least one patch is joined with the damaged spar cap by applying heat to the at least one patch by means of a heating blanket.

15. The method according to claim 1, wherein at least one doubler plate is being arranged on top of the at least one patch and the damaged spar cap and the at least one doubler plate is being joined with the at least one patch and the damaged spar cap.

* * * * *